United States Patent
Wada

(10) Patent No.: US 7,471,215 B2
(45) Date of Patent: Dec. 30, 2008

(54) MOVING OBJECT POSITION DISPLAY DEVICE AND METHOD

(75) Inventor: Kazunari Wada, Kanagawa (JP)

(73) Assignee: Panasonic Corporation, Osaka (JP)

( * ) Notice: Subject to any disclaimer, the term of this patent is extended or adjusted under 35 U.S.C. 154(b) by 19 days.

(21) Appl. No.: 10/570,106

(22) PCT Filed: Aug. 27, 2004

(86) PCT No.: PCT/JP2004/012760

§ 371 (c)(1),
(2), (4) Date: Jan. 25, 2007

(87) PCT Pub. No.: WO2005/022086

PCT Pub. Date: Mar. 10, 2005

(65) Prior Publication Data

US 2007/0109148 A1    May 17, 2007

(30) Foreign Application Priority Data

Sep. 1, 2003    (JP)    ............................. 2003-309065

(51) Int. Cl.
*G08G 1/123*    (2006.01)
(52) U.S. Cl. ..................... 340/990; 340/994; 701/204; 701/211
(58) Field of Classification Search .............. 340/990, 340/995.1
See application file for complete search history.

(56) References Cited

U.S. PATENT DOCUMENTS

2001/0047240 A1 * 11/2001 Lee ........................ 701/208
2002/0093541 A1 * 7/2002 Schileru-Key .............. 345/855
2004/0107048 A1 * 6/2004 Yokota ..................... 701/211
2004/0239699 A1 * 12/2004 Uyttendaele et al. ........ 345/716

FOREIGN PATENT DOCUMENTS

| JP | 03-131714 | 6/1991 |
| JP | 2002-257556 A | 9/2002 |
| JP | 2002-340590 A | 11/2002 |

OTHER PUBLICATIONS

International Search Report for PCT/JP2004/012760, dated Oct. 19, 2004.

* cited by examiner

*Primary Examiner*—Jeff Hofsass
*Assistant Examiner*—Ojiako Nwugo
(74) *Attorney, Agent, or Firm*—RatnerPrestia

(57) ABSTRACT

Additional information is provided to a moving object mark to enhance viewability and improve convenience. A moving object position display device has an information data obtaining part obtaining information data including an icon associated with a target, a map data obtaining part obtaining map data, a display part displaying a map corresponding to the moving object position with a moving object mark, and a moving object mark display control part reading an icon and a description associated with the target from the information data obtaining part to display it in place of the moving object mark when the moving object position has made an approach to within a predetermined distance range from a predetermined target or has entered the same screen. The target need not be searched for from a map display screen. Having made an approach to the target as well as its position and description can be easily recognized.

8 Claims, 5 Drawing Sheets

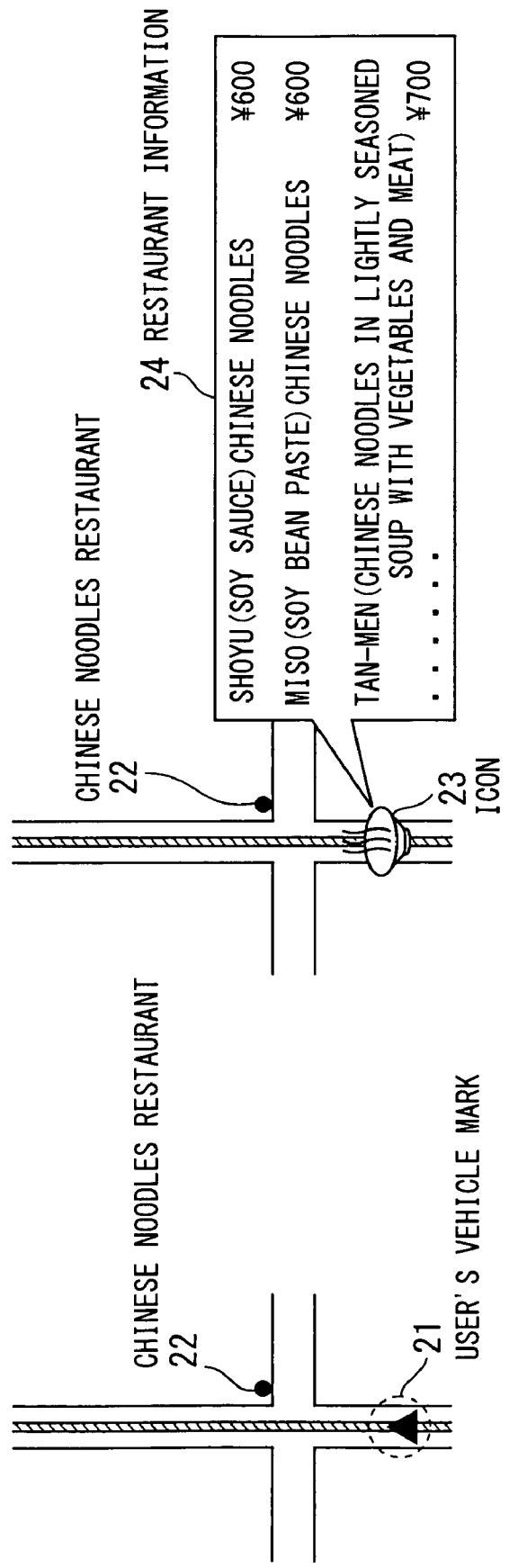

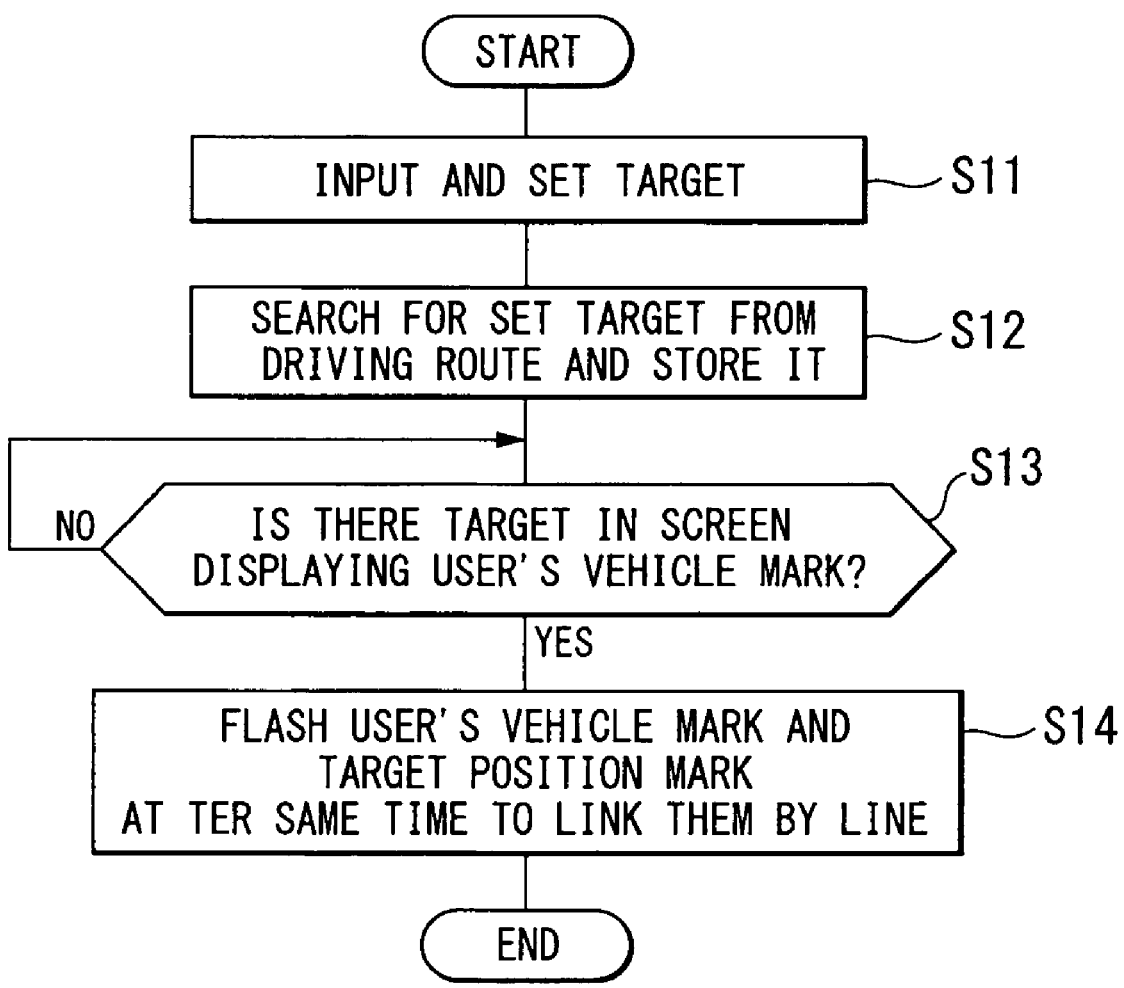

MOVING OBJECT POSITION DISPLAY DEVICE AND METHOD

This application is a U.S. National Phase Application of PCT International Application PCT/JP2004/012760.

BACKGROUND OF THE INVENTION

1. Field of the Invention

The present invention relates to a moving object position display device and method which detect the current position of a moving object to read road map data corresponding to the moving object position and display a moving object mark on the road map displayed on the display to guide a route.

2. Description of the Related Art

A vehicle navigation device is given as an example of a moving object position display device. The related art navigation device detects the current position of a user's vehicle as a moving object by current position detection means such as a GPS (Global Positioning System) receiver. The navigation device reads road map data corresponding to the current position from a storage medium such as a DVD (Digital Versatile Disc)-ROM to display the map on the display. The navigation device searches for a recommended route to a destination set by the user using route search means. The navigation device displays the recommended route overlapped with the map on the display with a user's vehicle mark, thereby guiding the user to the destination. When the user's vehicle position makes an approach to a junction such as an intersection and an interchange, its enlarged view and three-dimensional view are displayed to guide a driving direction and a distance to a reaching point by voice. Road traffic information such as traffic jam information on a route is obtained from a road beacon or FM multiplex broadcasting in VICS (Vehicle Information and Communication Systems) to be displayed on the display.

A user's vehicle mark displayed on the map on the display is very important for indicating the current position of a user's vehicle. The displayed position of the user's vehicle mark is determined by map matching of the detected result of the current position detection means with the road map data. When there is a problem in the detection accuracy of the current position detection means, the user's vehicle mark will be displayed to be off the road or displayed on a different road. There has been proposed a navigation device which judges the position state of a user's vehicle mark and changes the display form of a display object (such as a facility, river, and one-way road) in which the user's vehicle mark on a map display screen is positioned so that the user can easily recognize the current state (see Japanese Patent Application Publication No. 2002-340590). An attempt to provide additional information to a user's vehicle mark itself has been made. There has been known a driving guiding device which changes the color of a user's vehicle mark in the case of detecting a user's vehicle position by radio navigation using a GPS receiver and of detecting a user's vehicle position by autonomous navigation using a direction sensor and a speed sensor (see Japanese Patent Application Publication No. Hei 03-131714).

The related art navigation device cannot be sufficient although an attempt to provide additional information to a user's vehicle mark itself has been made. In driving using the navigation device, a driving route from the current position to a destination is displayed. When searching for a facility such as a restaurant during driving, the user needs to stop the vehicle once to check it. A lot of location information or landmark information on the facility is displayed on the map screen displayed on the display. It is not preferable to search for it while driving.

SUMMARY OF THE INVENTION

The present invention has been made in view of such related art problems and an object of the present invention is to provide a moving object position display device and method which enhance viewability of necessary information and improve convenience.

To address the above problems, a moving object position display device according to the present invention has moving object position detection means for detecting a moving object position; moving object position judgment means for judging whether or not the moving object position has made an approach to within a predetermined distance range from a predetermined target; and display control means for, when the moving object position has made an approach to within the predetermined distance range from the predetermined target, displaying a moving object mark indicating the moving object position by marking information associated with the target.

According to this configuration, when the user's vehicle position has made an approach to a target which the user is going to or a target the user is searching for, in place of the related art moving object mark or with the related art moving object mark, marking information associated with the target is displayed. The user can easily recognize that the user's vehicle position has made an approach to the target without searching for the target from the map display screen. The moving object position display device according to the present invention can contribute to safer driving and moving. The marking information associated with a target is icon information simply displaying the target or control information for flashing a moving object mark and the target at the same time, displaying them in the same color, linking them by a straight line, or linking them by a route.

A moving object position display device according to the present invention has moving object position detection means for detecting a moving object position; moving object position judgment means for judging whether or not the moving object position has entered the same screen as that of a predetermined target; and display control means for, when the moving object position has entered the same screen as that of the predetermined target, displaying a moving object mark indicating the moving object position by marking position associated with the target.

According to this configuration, when a moving object position enters the same screen as that of a target which the user is going to or a target the user is searching for, in place of the related art moving object mark or with the related art moving object mark, marking information associated with the target is displayed. The user can easily recognize that the user's vehicle position has made an approach to the target without searching for the target from the map display screen. The moving object position display device according to the present invention can contribute to safer driving and moving.

The moving object position display device according to the present invention has input means for setting the predetermined target and setting an icon as the displayed marking information. According to this configuration, a target which the user is going to or a target the user is searching for can be previously set and a favorite icon can be selected from plural icons associated with the target to be displayed.

In the moving object position display device according to the present invention, the display control means stores the type of the set target, and when the moving object position has made an approach to a target of the same type, displays an icon associated with the target. According to this configuration, an icon associated with a target of the same type can be automatically displayed without inputting and setting the target when the moving object position has made an approach to the target of the type.

In the moving object position display device according to the present invention, when the moving object position has entered a predetermined area, the display control means displays an icon about a product, a sightseeing spot, or an event representing the area in place of the moving object mark. According to this configuration, when the moving object position display device recognizes that the moving object position has entered a predetermined area based on prefectural boundary information in road map data, for example, when the moving object position has entered Akita Prefecture, it can display an icon of an Akita dog as a product of Akita Prefecture, an icon of a butterbur as a prefectural flower of Akita Prefecture, or an icon of Kanto (a tall bamboo pole that has lanterns attached to it) used for a summer festival of Akita Prefecture.

In the moving object position display device according to the present invention, the display control means displays information on the target or area with the icon. According to this configuration, more specific information on the target or area can be obtained.

In the moving object position display device according to the present invention, information data including the marking information can be updated by a storage medium or communication means. According to this configuration, the latest information data can be obtained and a user's favorite icon can be selected.

In a moving object position display method according to the present invention, in the moving object position display device which displays a detected moving object position on a map displayed on a screen to guide a route, when the moving object position has made an approach to within a predetermined distance range from a predetermined target, a moving object mark indicating the moving object position is displayed by marking information associated with the target.

According to this configuration, when the moving object position has made an approach to a target which the user is going to or a target the user is searching for, in place of the related art moving object mark or with the related art moving object mark, marking information associated with the target is displayed. The user can easily recognize that the moving object position has made an approach to the target without searching for the target from the map display screen. The moving object position display method according to the present invention can contribute to safer driving and moving.

In a moving object position display method according to the present invention, in the moving object position display device which displays a detected moving object position on a map displayed on a screen to guide a route, when the moving object position has entered the same screen as that of a predetermined target, a moving object mark indicating the moving object position is displayed by marking information associated with the target.

According to this configuration, when the moving object position has entered the same screen as that of a target which the user is going to or a target the user is searching for, in place of the related art moving object mark or with the related art moving object mark, marking information associated with the target is displayed. The user can easily recognize that the moving object position has made an approach to the target without searching for the target from the map display screen.

The moving object position display method according to the present invention can contribute to safer driving and moving.

According to the present invention, when the moving object position has made an approach to within a predetermined distance range from a predetermined target or has entered the same screen, the moving object mark indicating the moving object position is changed to the marking information associated with the target to be displayed. When the moving object position has made an approach to a target which the user is going to or a target the user is searching for, in place of the related art moving object mark or with the related art moving object mark, the marking information associated with the target is displayed. The user can easily recognize that the moving object position has made an approach to the target without searching for the target from the map display screen. Viewability of necessary information can be enhanced and convenience can be improved. The moving object position display method according to the present invention can contribute to safer driving and moving. Additional information is provided to the moving object mark which is seen on the display screen most often. Necessary information can be obtained to some extent simply by seeing the moving object mark. The utility value of the navigation device can be enhanced.

The above object and advantages of the present invention will be further apparent by the following embodiments described with reference to the drawings.

BRIEF DESCRIPTION OF THE DRAWINGS

FIG. 3 is a schematic diagram illustrating a user's vehicle mark display control operation according to an embodiment of the present invention;

FIG. 4 is a flowchart showing another user's vehicle mark display control operation according to an embodiment of the present invention.

DETAILED DESCRIPTION OF THE PREFERRED EMBODIMENTS

Figure 1:
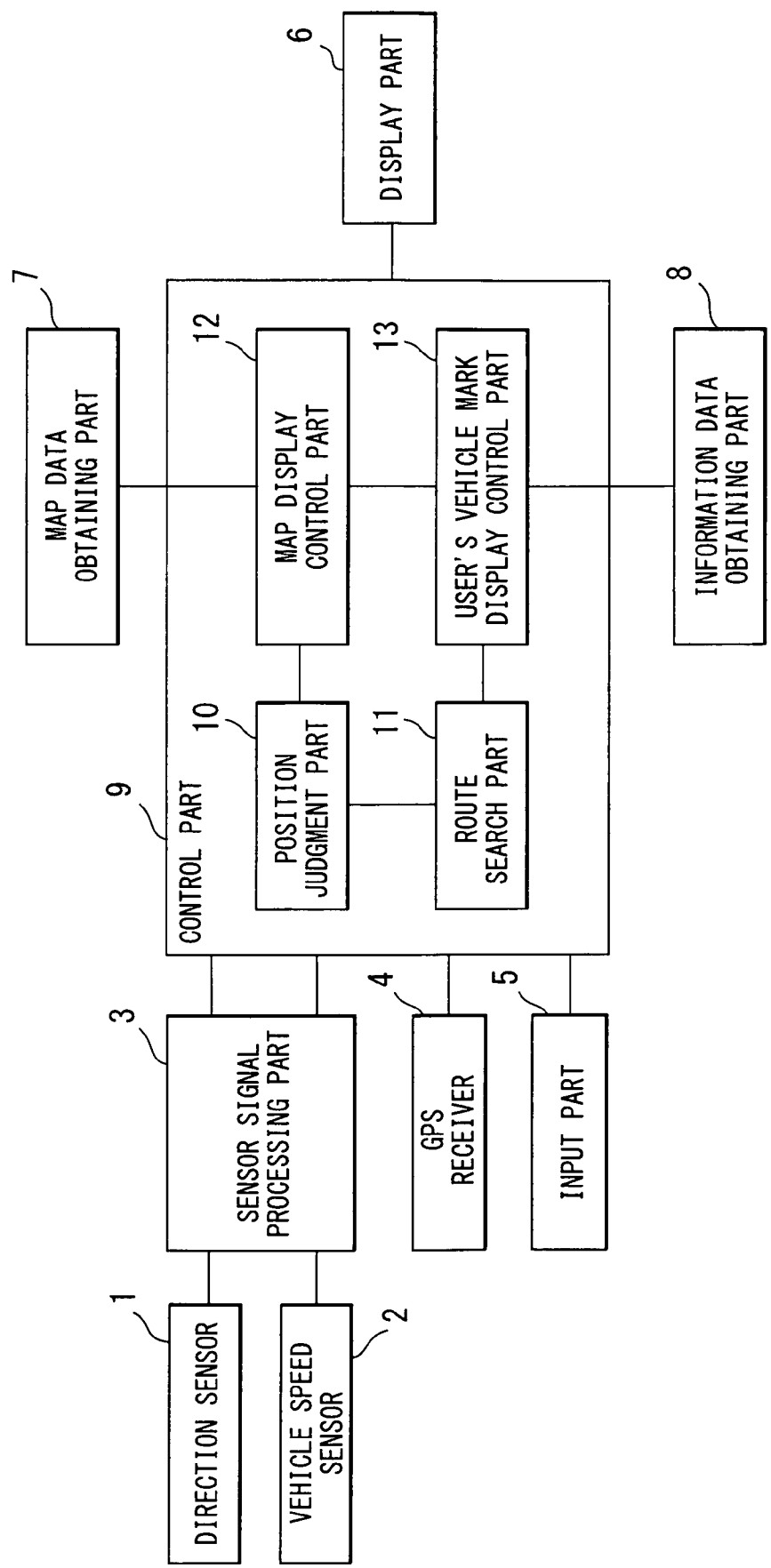
FIG. 1 is a block diagram showing the schematic configuration of a navigation device according to an embodiment of the present invention.

Embodiments of the present invention will be described below using the drawings. FIG. 1 shows the schematic configuration of a vehicle navigation device as a moving object position display device according to an embodiment of the present invention. According to this embodiment, the vehicle navigation device will be described as an example of a moving object position display device and can be applied to a position display device of a general moving object (e.g., a cellular phone or a portable terminal) as well as of a vehicle.

The navigation device has a direction sensor 1 detecting the moving direction of a moving object such as a vehicle, a vehicle speed sensor 2 detecting the speed of a vehicle and generating a pulse according to the number of revolutions of wheels to detect a vehicle speed, a sensor signal processing part 3 computation-processing a signal from the direction sensor 1 and the vehicle speed sensor 2, a GPS receiver 4 receiving a radio wave transmitted from a GPS (Global Positioning System) satellite, and an input part 5 performing various input settings. The navigation device according to this embodiment also has a display part 6 displaying a map and a user's vehicle mark, a map data obtaining part 7 obtaining road map data from an external device and a storage medium, an information data obtaining part 8 obtaining various pieces of information associated with map data from an external device and a storage medium, and a control part 9 controlling the operation of the navigation device.

In FIG. 1, the direction sensor 1 detects the relative driving direction of an automobile and a vibration gyro is used therefor. The vehicle speed sensor 2 generates a pulse according to the number of revolutions of wheels to detect a vehicle speed. The sensor signal processing part 3 processes a sensor signal from the direction sensor 1 and the vehicle speed sensor 2 to compute the moving direction and mileage of a vehicle. The GPS receiver 4 receives a radio wave transmitted from plural GPS satellites for computation processing and determines the position (latitude and longitude) of a receiving point. The input part 5 is a touch panel and a remote control performing input setting of a destination and marking information and other input settings. The display part 6 is a liquid crystal display displaying information necessary for driving such as a map, a user's vehicle mark, and a driving route. The map data obtaining part 7 is a drive, an interface, or communication means obtaining road map data from a storage medium such as a DVD and a memory card or from an external device via a network. The information data obtaining part 8 is a drive, interface, or communication means obtaining position information and guide information on a target such as a facility and a sightseeing spot and an area such as a prefecture, city, town, and village and marking information such as an icon associated with a target or an area from a storage medium such as a DVD and a memory card or from an external device via a network. The control part 9 is a microprocessor controlling the entire navigation device and, in order to control the operation of the navigation device, has a position judgment part 10 judging in what position on a display screen a detected current position is located and the length of a distance between an inputted and set target and the current position, a route search part 11 searching for a route to an inputted and set destination, a map display control part 12 reading map data corresponding to the detected current position or required map data from the map data obtaining part 7 to display it on the display part 6, and a user's vehicle mark display control part 13 reading marking information corresponding to a target set by the user from the input part 5 from the information data obtaining part 8 to display it in place of or with a user's vehicle mark.

The operation of the thus-configured navigation device will be described. The outline of the navigation operation will be described. In FIG. 1, outputs of the direction sensor 1 and the vehicle speed sensor 2 are sent via the sensor processing part 3 to the control part 9. Data from the GPS satellite received by the GPS receiver 4 is sent to the control part 9. The control part 9 computes the latitude and longitude of the current position of a user's vehicle from the data. Map data corresponding to the computed current position is read from the map data obtaining part 7. The read map data is converted to image data to be sent to the display part 6. The map within a predetermined range is displayed with the user's vehicle mark. The route to a destination searched for by the route search part 11 is displayed to be overlapped with the map. The user's vehicle position is changed according to the driving of the vehicle. The corresponding map data is sequentially read to update the map screen.

Figure 2:
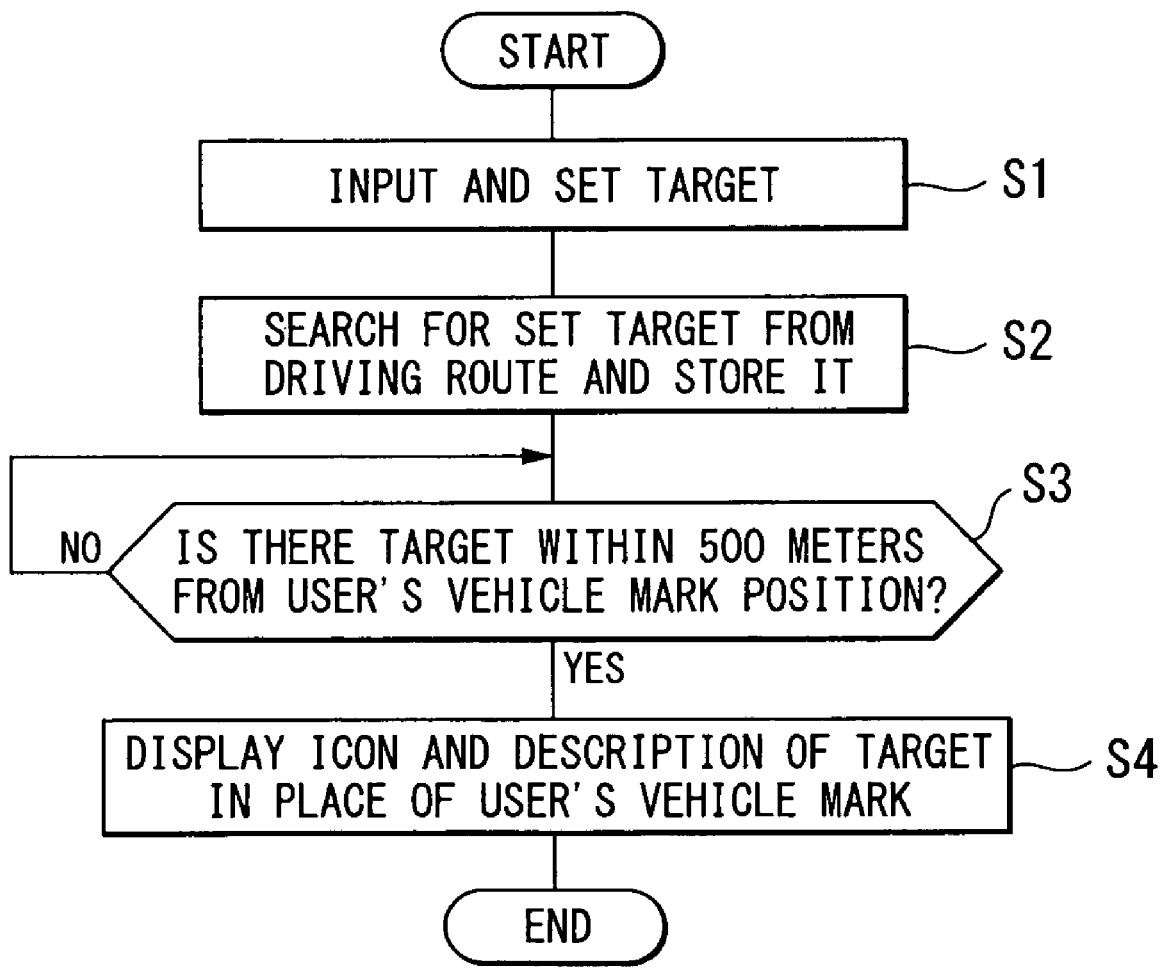
FIG. 2 is a flowchart showing a user's vehicle mark display control operation according to an embodiment of the present invention.

The user's vehicle mark display control operation of the control part 9 according to this embodiment will be described using FIG. 2. A user's vehicle drives on a route searched for by the route search part 11. A target is inputted and set (step S1). For example, when the user thinks that he/she is going to eat Chinese noodles (Chinese soba) for today's lunch, the user stops the vehicle before starting or while driving to call the menu screen from the input part 5 and then selects the "User's vehicle position marking information" from the "Search" screen so that the facility types are displayed. The user selects "Eating" and then "Restaurant (Chinese food)". The corresponding plural targets on the driving route are searched for from the information data obtaining part 8. Restaurant information such as a charge is stored in a memory in the control part 9 with its position information (step S2). When driving is started in this state, the position judgment part 10 checks, for example, every five minutes whether there is a restaurant offering Chinese noodles as a target, e.g., within 500 meters, from the user's vehicle position, that is, the position in which the user's vehicle mark is displayed (step 3). When there is one, in place of a user's vehicle mark 21 currently displayed as shown in FIG. 3A, the user's vehicle mark display control part 13 displays an icon 23 of a Chinese noodles restaurant 22 as shown in FIG. 3B, and then, restaurant information 24 (step S4). That the user's vehicle mark 21 has been changed to the icon 23 may be noticed to the user by sound.

Figure 5A:
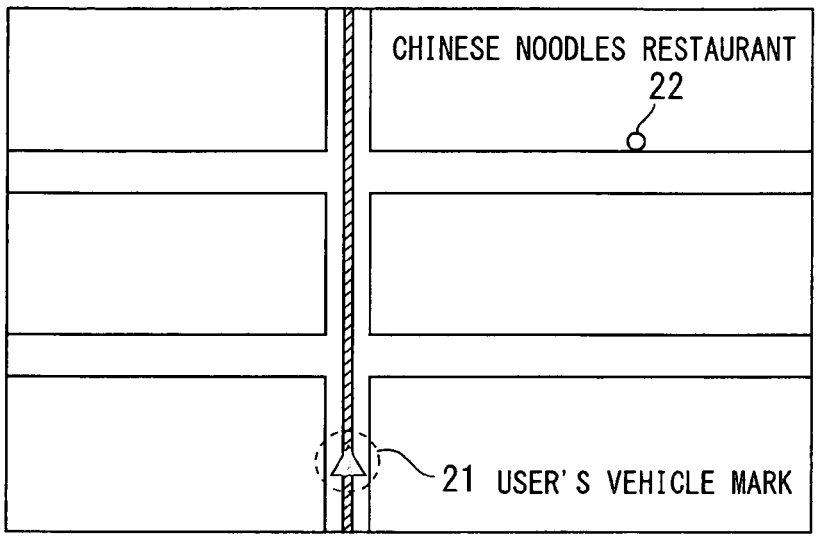
FIG. 5 is a schematic diagram illustrating another user's vehicle mark display control operation according to an embodiment of the present invention.
Figure 5B:
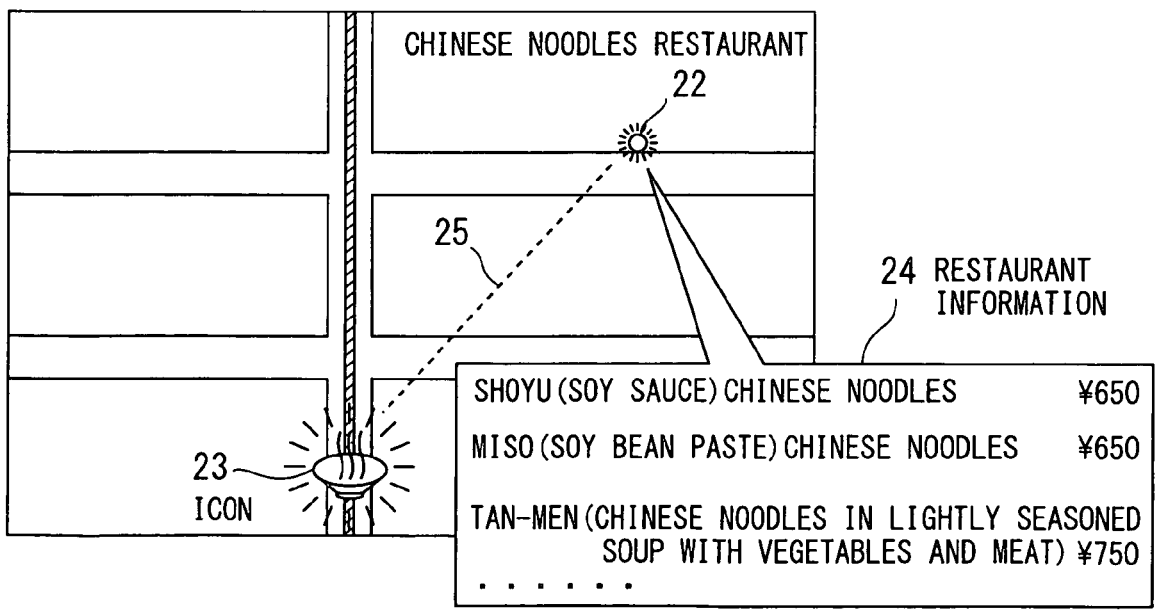

Alternatively, as described above, as shown in FIG. 4, a target is inputted and set (step S11), and then, the set target is searched for from the driving route to be stored (step S12). The position judgment part 10 checks, for example, every five minutes whether there is a restaurant offering Chinese noodles as a target within the same screen as that displaying the user's vehicle position, that is, the user's vehicle mark (step S13). When there is one, in place of the user's vehicle mark 21 currently displayed as shown in FIG. 5A, the user's vehicle mark display control part 13 displays the icon 23 of the Chinese noodles restaurant 22 as shown in FIG. 5B, links the icon 23 to the restaurant by a connecting line 25, and displays the icon 23 and the Chinese noodles restaurant 22 in the same noticeable color to flash them at the same time (step S14). Any one of linking the icon 23 with the Chinese noodles restaurant 22 by the connecting line 25, displaying the icon 23 and the Chinese noodles restaurant 22 in the same color, and flashing the icon 23 and the Chinese noodles restaurant 22 at the same time may be performed. The connecting line 25 may be a line along a road. In this example, the user's vehicle mark 21 remains the same without being changed to the icon 23. The user's vehicle mark 21 and the Chinese noodles restaurant 22 are clearly associated with each other by the connecting line 25, the same color, and flashing at the same time. The Chinese noodles restaurant 22 can be easily grasped.

According to this embodiment, it has the user's vehicle position detection means such as the direction sensor 1 detecting the current position of a user's vehicle, the vehicle speed sensor 2, and the GPS receiver 4, the information data obtaining part 8 obtaining information data including an icon associated with a target, the map data obtaining part 7 obtaining map data, the display part 6 displaying a map corresponding to the user's vehicle position detected by the user's vehicle position detection means with a user's vehicle mark, and the user's vehicle mark display control part 13 reading an icon and a description associated with the target from the information data obtaining part 8 to display it in place of the user's vehicle mark when a user's vehicle position has made an approach to within a predetermined distance range from a predetermined target or has entered the same screen. The target need not be searched for from the map display screen. Having made an approach to the target and its position and description can be easily recognized. When the user's vehicle position has made an approach to the target, the user's vehicle mark is changed. Having made an approach to the target can be easily noticed.

According to the above embodiment, the Chinese noodles restaurant is set as the target. When searching for a pet shop in the same manner, an icon of a dog or cat can be displayed in place of the user's vehicle mark. In this case, the number of items and the contents of an information database may be fulfilled so as to select an icon of a dog or cat of the user's favorite type.

According to the above embodiment, the user's vehicle drives on the route set by the route search means 11. When the user's vehicle does not drive on the set route or drives without setting any route, the user's vehicle is stopped once to perform peripheral facility search by narrowing down to a predetermined distance from a user's vehicle position, e.g., within the range of 5 or 10 kilometers. After the position information obtained by this search is stored, as in the above embodiment, when the user's vehicle has entered within the range of 500 meters from the target or in the same screen, the user's vehicle mark can be changed.

According to this embodiment, before starting driving or while driving, the "user's vehicle position display marking information" is inputted and set because a target is different for each drive. In driving on the same route like a regularly running truck, the same target is often selected. In such a case, the inputted and set "user's vehicle position display marking information" is stored. Without inputting and setting it next time, when the user's vehicle position has made an approach to a target of the same type, an icon can be automatically displayed. In this case, the "user's vehicle position display marking information" can be stored for each inputted and set type and can be erased as necessary.

According to this embodiment, when prefectural boundary information on a prefecture, a city, a town, and a village included in the roadmap data and is obtained, an icon about a product, a sightseeing spot, and an event representing the area may be displayed in place of the user's vehicle mark. When the user's vehicle position enters Yamanashi Prefecture, an icon of Mt. Yatsugatake as a sightseeing spot representing Yamanashi Prefecture is displayed. Then, an icon of a pear, grapes, or a peach as a product representing Yamanashi Prefecture is sequentially displayed. The user can recognize that the user's vehicle position has entered Yamanashi Prefecture.

Information data including marking information obtained by the information data obtaining part 8 is updated to a new version to use the latest information.

As is apparent from the above description, the user's vehicle position display device and method according to the present invention can enhance the viewability of necessary information simply by seeing the user's vehicle mark. The user's vehicle position display device and method according to the present invention are useful for a route guiding device or a navigation device which detects the current position of a user's vehicle to read road map data corresponding to the user's vehicle position and displays the user's vehicle mark on the road map displayed on the display to guide a route. The user's vehicle position display device and method according to the present invention can be applied to a portable route guiding device.

The present invention is described above based on the preferred embodiments shown in the drawings. It is apparent that those skilled in the art can easily make various changes and modifications without departing from the idea of the present invention. The present invention includes such modification examples.

What is claimed is:

1. A moving object position display device, said display device comprising:
    a detection section operable to detect a current position of the moving object; a judgment section operable to judge whether or not the detected current position has made an approach to within a predetermined distance range from a predetermined target; and
    a display section operable to display, while the judgment is negative, a first map on which a first mark is overlaid at the detected current position; wherein
    the display section further displays, while the judgment is affirmative, a second map on which a second mark is overlaid at the detected current position, the second mark being different from the first mark and being relative to the predetermined target.

2. The moving object position display device according to claim 1, said device further comprising an input section operable to set the predetermined target and to set an icon as the second mark.

3. The moving object position display device according to claim 2, said device further comprising a storage section operable to store the type of the set target, wherein
    the judgment section operable to judge whether or not the detected current position has made an approach to within a predetermined distance range from a predetermined target, the predetermined target having a type identical to the stored type of the set target; and
    the display section further displays, while the judgment is affirmative, the second map on which the icon as the second mark is overlaid at the detected current position.

4. The moving object position display device according to claim 2, wherein the icon is indicative of a product, a sightseeing spot, or an event representing the area.

5. The moving object position display device according to claim 4, wherein the display section further displays information on the target or the area with the icon.

6. The moving object position display device according to claim 1, wherein the second mark is updated by a storage medium or communication means.

7. A moving object position display method comprising the steps of:
    detecting a current position of the moving object;
    judging whether or not the detected current position has made an approach to within a predetermined distance range from a predetermined target;
    displaying, while the judgment is negative, a first map on which a first mark is overlaid at the detected current position; and
    displaying, while the judgment is affirmative, a second map on which a second mark is overlaid at the detected current position, the second mark being different from the first mark and being relative to.

8. The moving object position display device according to claim 1, wherein the predetermined range is a range corresponding to the first map displayed by the display section.

* * * * *